United States Patent [19]

Clarke

[11] Patent Number: 4,817,899
[45] Date of Patent: Apr. 4, 1989

[54] BRACKET

[76] Inventor: Stephen G. Clarke, 330 Riply Hill Rd., Coventry, Conn. 06238

[21] Appl. No.: 82,799

[22] Filed: Aug. 6, 1987

[51] Int. Cl.[4] .............................................. A47B 96/06
[52] U.S. Cl. ................................ 248/205.1; 248/218.4
[58] Field of Search ............... 248/218.4, 219.1, 219.4, 248/205.1, 122, 317, 200; 47/67; 40/607

[56] References Cited

U.S. PATENT DOCUMENTS

| | | |
|---|---|---|
| 303,877 | 8/1884 | Neblett . |
| 1,048,706 | 12/1912 | Kleinhesselink ................. 248/219.4 |
| 2,274,411 | 2/1942 | Hill et al. .......................... 248/219.4 |
| 2,294,998 | 9/1942 | Mitchell ............................... 248/282 |
| 2,459,909 | 1/1949 | Alofs .................................... 248/303 |
| 3,126,575 | 3/1964 | Schoenberg .................... 248/317 X |
| 3,309,047 | 3/1967 | Kane ............................ 248/219.4 X |
| 3,746,294 | 7/1973 | Johnston ............................. 248/224 |
| 3,967,578 | 7/1976 | Gallo ................................... 47/67 X |
| 4,015,809 | 4/1977 | Buril ..................................... 248/217 |
| 4,038,780 | 8/1977 | Bruno .................................. 47/67 X |
| 4,167,255 | 9/1979 | Benson ........................ 248/218.4 X |
| 4,570,884 | 2/1986 | Armbruster ....................... 248/68.1 |

FOREIGN PATENT DOCUMENTS 1074461 10/1954 France ............................. 248/219.1

Primary Examiner—J. Franklin Foss

[57] ABSTRACT

A cantilevered bracket suitable for stable but flexible mounting of a birdfeeder or the like at a position spaced from a mounting surface from which the bracket is mounted and from the ground, the bracket having an upper arm, and a lower arm integrally joined at respective outer ends by a generally arcuate member and, at respective inner ends of the arms, means for attachment of the arm separately to a mounting surface, and means associated with the lower arm for engagement by a hanger of a birdfeeder and the like.

6 Claims, 1 Drawing Sheet

4,817,899

BRACKET

BACKGROUND OF THE INVENTION

The invention relates to cantilevered brackets for mounting hanging articles, e.g., birdfeeders or the like.

SUMMARY OF THE INVENTION

In general, the invention features, in one aspect, a cantilevered bracket suitable for flexible but stable mounting of a hanging birdfeeder or the like at a position spaced from a surface from which the bracket is mounted and from the ground, the bracket comprising an upper arm, and a lower arm integrally joined at respective outer ends by a generally arcuate member; at respective inner ends of the arms, means for attachment of the arms separately to a generally vertical mounting surface; and means associated with the lower arm for engagement by a hanger of a birdfeeder or the like.

Preferred embodiments of the above invention include one or more of the following features. The means for engagement is a detent means defined by an upper surface of the lower arm. The means for engagement is spaced outwardly along the lower arm, whereby a birdfeeder or the like mounted from the bracket is spaced sufficiently from the mounting surface to restrict direct jumping access to the birdfeeder by squirrels. When the bracket is mounted, the upper arm and the lower arm are respectively disposed at angles below horizontal. The bracket is formed of rectangular bar stock and the detent means is formed either by grinding or by deforming the bar stock.

The invention features, in another aspect, a bracket for stable mounting of a birdfeeder or the like having a hanger with an arcuate portion, the bracket including an arm with an inner end having a means for attachment to a generally vertical surface, and an outer end including a means for holding the birdfeeder stable in the wind.

Preferred embodiments include one or more of the following features. The hanger includes an arcuate portion, and the means for holding includes a pair of spaced apart restraints on the arm for engaging the arcuate portion at two spread apart locations. The means for holding includes a pair of depressions defined in the upper and side surfaces of the arm. The bracket is formed of an integral piece of generally rectangular bar stock that is at least three times as wide as it is thick.

The bracket readily adapts for mounting from regular and irregular surfaces, and surfaces that are not exactly vertical. The construction of the bracket provides a stable, but flexible, permanent mount for birdfeeders or the like, engagement of the article hanger by the bracket serving to resist twisting, the pair of arms resulting in resilient support under varying loads, e.g., of wind, weather or animal, and the cantilever arrangement supporting the birdfeeder or other article at a position directly inaccessible to squirrels. The flexibility allows movement of the feeder or the like to adsorb shock from animals or wind gusts. The bracket is inexpensive and easy to manufacture.

Other features and advantages of the invention will be apparent from the description of the preferred embodiment thereof, and from the claims.

DESCRIPTION OF THE PREFERRED EMBODIMENT

The drawings will be described first.

Drawings

STRUCTURE

Figure 1:
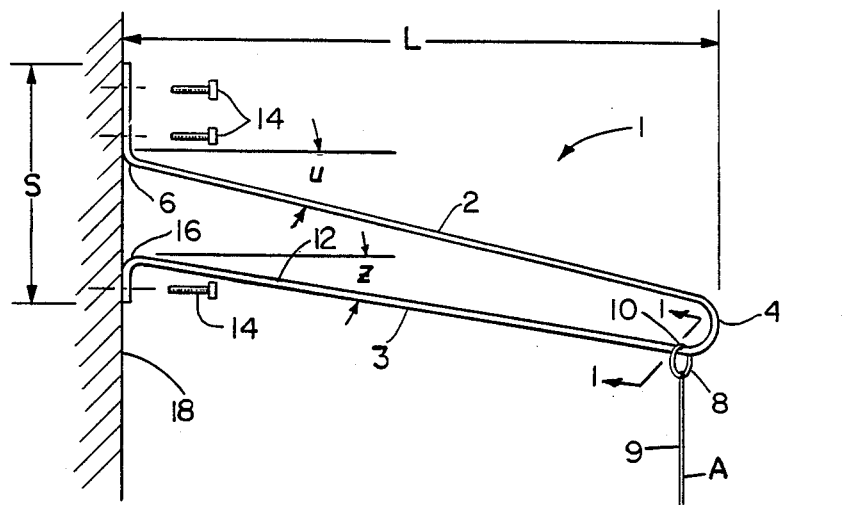
FIG. 1 is a side view of a bracket supporting a birdfeeder (shown partially).

Referring to the drawings, a bracket 1 has a air of resilient arms 2, 3 integrally joined at the outer ends by an arcuate portion 4. The inner end of the arm 2 terminates in upwardly-directed vertical portion 6, and the inner end of arm 3 terminates in downwardly-directed vertical portion 16. Vertical portions 6 and 16 define apertures for attachment of the arms of the bracket to a generally vertical surface 18 by means of fasteners 14, e.g., 1.5 inch lag bolts, fastened therethrough. The bracket is preferably formed from aluminum bar stock that has thickness T, e.g., 0.25 inch, and width W, e.g., 1.0 inch, bent to the described configuration. The mounted bracket extends from mounting surface 18 by length L, e.g., about 42 inches.

Figure 2:
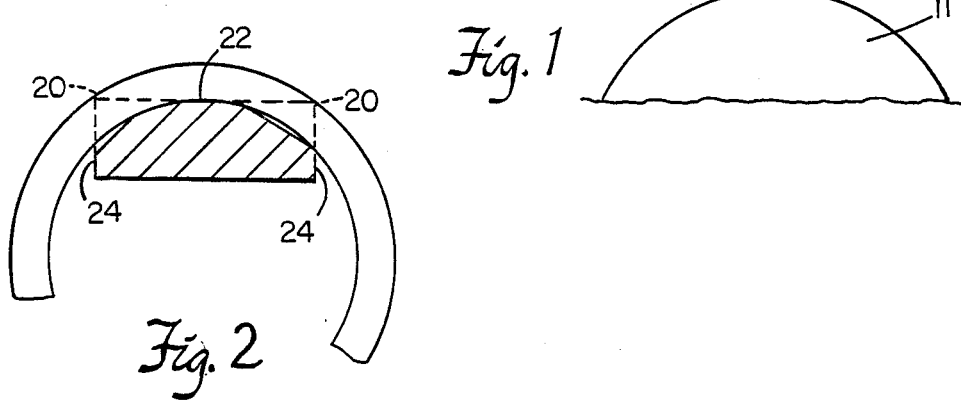
FIG. 2 is a section through 1-1 of FIG. 1.

Hanger engagement means 10 provided at the outer end of the arm 3, adjacent the arcuate portion 4, consists of detents 20 (FIG. 2) formed in the top and side surfaces (22, 24) of the arm 3, e.g., by grinding and sized for receiving a hanger ring 8 of, e.g., a birdfeeder 11 such as described in Clarke, U.S. Pat. No. 4,331,104, incorporated by reference herein. The detents stably support the birdfeeder at a spaced distance from surface 18, e.g., at least 3 feet (and more preferably at least 3.5 feet) and 5 feet from the ground to prevent a squirrel from leaping to the feeder. The detents 20 also keep the feeder from twisting about the axis A of feeder hanger 9 connecting the hanger to the feeder. A second hanger engagement means 12 is located toward the inner end of the arm 3, e.g., about 1 foot from mounting surface 18. The second engagement means consists of, e.g., detents similar to detents 20.

OPERATION

The bracket is mounted to mounting surface 18, e.g. a generally vertical surface of a tree trunk or patio post, as follows.

The hanger ring 8 of feeder hanger 9 is slid along arm 3 to engage in detents 20 of engagement means 10. The vertical portion 6 of bracket 1 is positioned on surface 18 at a height, H, sufficiently above the ground so that a squirrel on the ground, e.g., about 5 feet, cannot leap up and reach the feeder. With portion 6 held flat against mounting surface 18, the arm 2 slopes downwardly at an angle, U, e.g., about 60° to 75° below horizontal. Marks are made on surface 18 corresponding to the positions of the apertures in the vertical portion 6 and using an 0.125 inch drill, two pilot holes about 1 inch deep are drilled into surface 18. The bracket is positioned, and two lag bolts are inserted through the apertures, tapped into the surface, and tightened firmly.

Lower arm 3 is pressed against surface 18 until portion 16 is flat against the surface. The lower arm also typically slopes downwardly at an angle Z, e.g., on a vertical mounting surface, Z is about 5° to 20° below horizontal, and a distance S, e.g., about 20 inches on a vertical mounting surface, separates the top edge of portion 6 from the bottom edge of portion 16. Vertical portion 16 is secured to the surface 18 by means of a lag bolt 14 in the same manner described above.

The birdfeeder 11 is then attached to the feeder hanger 9, and filled with feed. Squirrels attempting to snatch feed from the feeder cannot jump directly to the feeder from the mounting surface 18 or from the ground. Engagement means 10 resists twisting movement of the hanger ring, and thus the feeder, in the wind. Moreover, the entire bracket is resiliently flexible, with no undue stress points at which the bracket may break under load, e.g., in high winds. The bracket may typically support up to 40 pounds of weight.

Where the bracket is mounted near a window, engagement means 12 allow the feeder to be readily filled from inside the house as follows. A person reaches out the window and slides the feeder along the lower arm 3 until the ring rests in the detents of engagement means 12. The feeder is filled, and then slid back down the arm until the ring rests in the detents 20.

OTHER EMBODIMENTS

Figure 3:
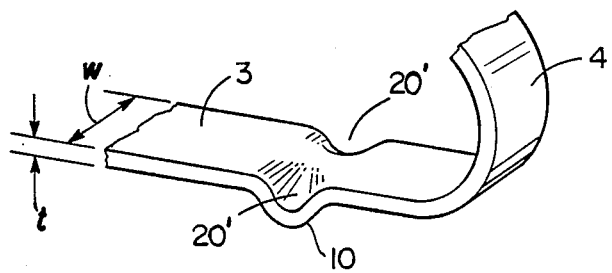
FIG. 3 is an enlarged view of the outer portion of a bracket of the invention, showing an alternate embodiment of the hanger engagement means.

Other embodiments are within the following claims. For example, the bracket can be used to support objects other than birdfeeders, e.g. hanging baskets, flower pots, or signs. The hanger engagement means may consist of detents 20' (FIG. 3) formed by deforming the bar stock of the lower arm 3.

I claim:

1. A cantilevered bracket suitable for hanging a birdfeeder or the like at a position spaced from a mounting surface from which said bracket is mounted and from the ground, said bracket comprising an upper arm, and a lower arm integrally joined at respective outer ends by a generally arcuate member and, at respective inner ends of said arms, means for attachment of said arms separately to a generally vertical mounting surface, and means associated with said lower arm for engagement by a hanger of a birdfeeder or the like, wherein said means for engagement comprises a detent means defined in upper and side surfaces or said lower arm, and wherein a hanger for a birdfeeder or the like has an arcuate portion, and said detent means has the form of a pair of depressions for securing said arcuate portion or said hanger.

2. The bracket of claim 1, wherein said means for engagement is spaced outwardly along said lower arm, whereby a birdfeeder or the like mounted from said bracket is spaced sufficiently from said mounting surface to restrict access to said birdfeeder by a squirrel.

3. The bracket of claim 1, wherein said bracket is formed of an integral piece of generally rectangular bar stock.

4. A cantilevered bracket suitable for hanging a birdfeeder or the like at a position spaced from a mounting surface from which said bracket is mounted and from the ground, said bracket comprising an upper arm, and a lower arm integrally joined at respective outer ends by a generally arcuate member and, at respective inner ends or said arms, means for attachment of said arms separately to a generally vertical mounting surface, and means associated with said lower arm for engagement by a hanger or a birdfeeder or the like, wherein, when said bracket is mounted on said mounting surface, said upper arm and said lower arm are respectively generally predominantly disposed at angles below horizontal from the location or said attachment to said vertical mounting.

5. The bracket of claim 4, wherein said upper arm is disposed at an angle of about 60° to 75° below horizontal.

6. The bracket of claim 4, wherein said lower arm is disposed at an angle of about 5° to 20° below horizontal.

* * * * *